(12) United States Patent
Shen

(10) Patent No.: US 6,926,808 B2
(45) Date of Patent: Aug. 9, 2005

(54) VACUUM LOW-TEMPERATURE DISTILLED PURE WATER DISPENSER

(76) Inventor: Wen Chao Shen, 6F, No. 9, Lane 113, Lungchiuan 1st Street, Taoyuan City (TW)

( * ) Notice: Subject to any disclaimer, the term of this patent is extended or adjusted under 35 U.S.C. 154(b) by 716 days.

(21) Appl. No.: 10/073,192

(22) Filed: Feb. 13, 2002

(65) Prior Publication Data

US 2004/0011637 A1 Jan. 22, 2004

(51) Int. Cl.⁷ .............................. B01D 3/03; C01F 1/04
(52) U.S. Cl. ......................... 202/205; 202/83; 202/206; 203/10; 222/113
(58) Field of Search ......................... 202/83, 205, 206, 202/176, 181; 203/10; 222/113

(56) References Cited

U.S. PATENT DOCUMENTS

| | | | | |
|---|---|---|---|---|
| 5,200,039 A | * | 4/1993 | Weber et al. | ................ 202/197 |
| 5,511,388 A | * | 4/1996 | Taylor et al. | ................. 62/389 |
| 5,567,308 A | * | 10/1996 | Visser | ......................... 210/232 |
| 6,294,054 B1 | * | 9/2001 | Sutter | ......................... 202/176 |
| 6,830,661 B1 | * | 12/2004 | Land | ............................ 202/83 |
| 2004/0129723 A1 | * | 7/2004 | Meder et al. | ............... 222/113 |

* cited by examiner

Primary Examiner—N. Bhat

(57) ABSTRACT

A vacuum low-temperature distilled pure water dispenser includes a water-supply tank communicating with a reaction chamber via a water supply line, a pure water storage tank communicably located above the reaction chamber, an actuating pump communicably located below the reaction chamber, and a refrigerating system having pipe lines extended between the reaction chamber and the pure water storage tank. When the actuating pump is actuated, a vacuum is produced in the reaction chamber to suck water in the water-supply tank into the reaction chamber, at where the sucked water is heated and vaporized by heat provided by a compressor of the refrigerating system, so that impurities, organic and inorganic matters, bacteria, and viruses in the water are separated therefrom through vacuum low-temperature distillation. When the actuating pump keeps pumping, the distilled water is sent from the reaction chamber into the pure water storage tank.

1 Claim, 8 Drawing Sheets

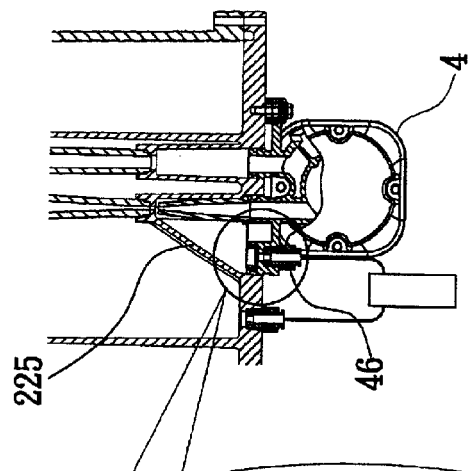
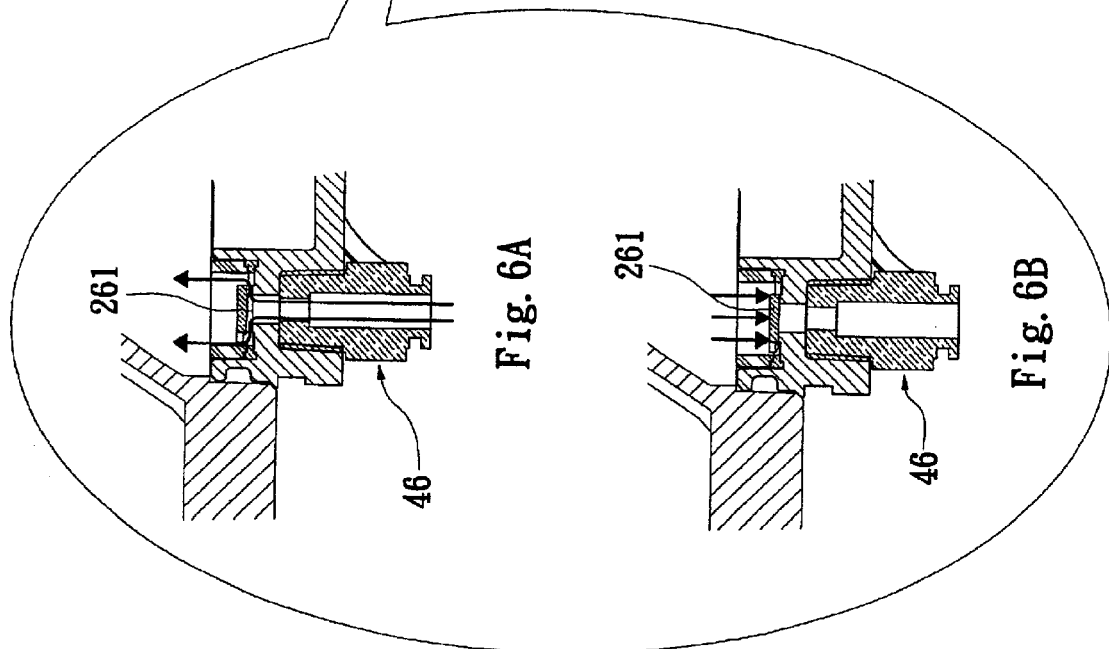

VACUUM LOW-TEMPERATURE DISTILLED PURE WATER DISPENSER

BACKGROUND OF THE INVENTION

The present invention relates to a vacuum low-temperature distilled pure water dispenser, and more particularly to a pure water dispenser that utilizes heat produced by a refrigerating system to proceed vacuum low-temperature distillation of water in a reaction chamber, so as to obtain pure drinking water.

Most commercially available water filters filter water simply by causing water to flow through filter materials and therefore do not provide good water purification effect. Only large-size impurities are strained off but not all the small-size impurities. Moreover, the filter materials having been used over a long period of time would have too many impurities attached thereto to produce bacteria and therefore lose their filtering function and even pollute the water flowing therethrough.

The RO (reverse osmosis) water purifier is developed in an attempt to eliminate drawbacks existing in the conventional water filters by providing three filter elements to proceed stepped water filtering. The first filter element strains off large-size impurities, the middle filter element further strains off small-size impurities, and the last filter element is a ceramic filter element and strains off other impurities remained in the water. Although the RO water purifier largely improves the purification of water, the problem of polluted filtering materials still exists. Moreover, organic and inorganic matters dissolved in water could not be removed through general filtration process.

The filter elements having been used for a long period of time and having a large amount of impurities attached thereto must be discarded and replaced with new ones. Purchase of new filter elements is therefore an additional burden to users. The ceramic filter element is particularly expensive and forms a constant expenditure if a RO water purifier is used. Moreover, the discarded filter elements must be collected and disposed carefully to avoid second environmental pollution that increases the social cost.

Apart from the costs of the filter elements, the efficiency or quality of water purification that can be provided by the water filters and water purifiers is also an important concern among the consumers. There is a distillation water maker developed and available in the markets. The distillation water maker employs the principle of normal-pressure high-temperature boiling to vaporize boiled water and then condense vapors produced therefrom, in order to remove impurities from the water. Increased power consumption is required in this type of water purification and a stainless steel water container thereof must be frequently cleaned to remove deposited matters and scales therefrom. For a general domestic model of the distillation water maker, distillation water can be produced at a rate of about 12 liters per day (or about 4 liters per 8-hour), which is not economical as compared with most conventional water purifiers. And, it is known that boiling of water does not kill all kinds of bacteria, and some pollutants, such as heavy metals, agrochemicals, positive and negative ions (such as metal ions that result in hard water), and water-soluble solids, that have boiling points higher than that of water would remain in the distillation water maker while other volatile organic matters, such as methenyl trihalogen, that have boiling points lower than that of water would very possibly enter a storage tank of the distillation water maker along with the distilled water. That is, the distilled water is polluted when it is produced.

It is therefore tried by the inventor to develop a pure water dispenser that employs the principle of heat exchange and uses heat produced by a compressor thereof to distill water under a vacuum and low-temperature environment, and thereby eliminates drawbacks existing in the conventional water filters and purifiers.

SUMMARY OF THE INVENTION

A primary object of the present invention is to provide a vacuum low-temperature distilled pure water dispenser, in which water supplied from a water source is boiled and vaporized at low temperature in a vacuum environment. Since the vaporized water molecule is as small as one thousandth of general bacteria, all organic and inorganic matters, including impurities, bacteria and viruses, are separated from the water through vacuum low-temperature distillation. Moreover, since only a low temperature is needed to distill the water in the vacuum environment, heat naturally produced by a compressor of the pure water dispenser is sufficient for use in the distillation. The distilled water is absolutely clean and pure to meet required standards for drinking water.

To achieve the above and other objects, the vacuum low-temperature distilled pure water dispenser of the present invention mainly includes a water-supply tank communicating with a reaction chamber via a water supply line, a pure water storage tank communicably located above the reaction chamber, an actuating pump communicably located below the reaction chamber, and a refrigerating system having pipe lines extended between the reaction chamber and the pure water storage tank. By closing a solenoid relief valve at one side of the reaction chamber and starting the actuating pump, a vacuum is produced in the reaction chamber to close an automatic one-way drain valve at a bottom of the reaction chamber and suck water in the water-supply tank into the reaction chamber. A ball float valve assembly is provided to automatically control the volume of water that can be sucked into the reaction chamber. Heat produced by a compressor of the refrigerating system is transmitted to the reaction chamber to distill the water in the vacuumized reaction chamber at low temperature. Vapors of the distilled water condense to pure water that is collected in an inner barrel of the reaction chamber. When the actuating pump keeps pumping, the distilled water collected in the inner barrel is drawn from the reaction chamber into the pure water storage tank. The pure water obtained in this manner is therefore highly purified drinking water.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 6 is a fragmentary sectional view showing a water outlet check valve included in the pure water dispenser of the present invention;

FIG. 6A is a partially enlarged view of FIG. 6 showing the water outlet check valve in an opened state;

FIG. 6B is a partially enlarged view of FIG. 6 showing the water outlet check valve in a closed state;

DETAILED DESCRIPTION OF THE PREFERRED EMBODIMENTS

Figure 1:
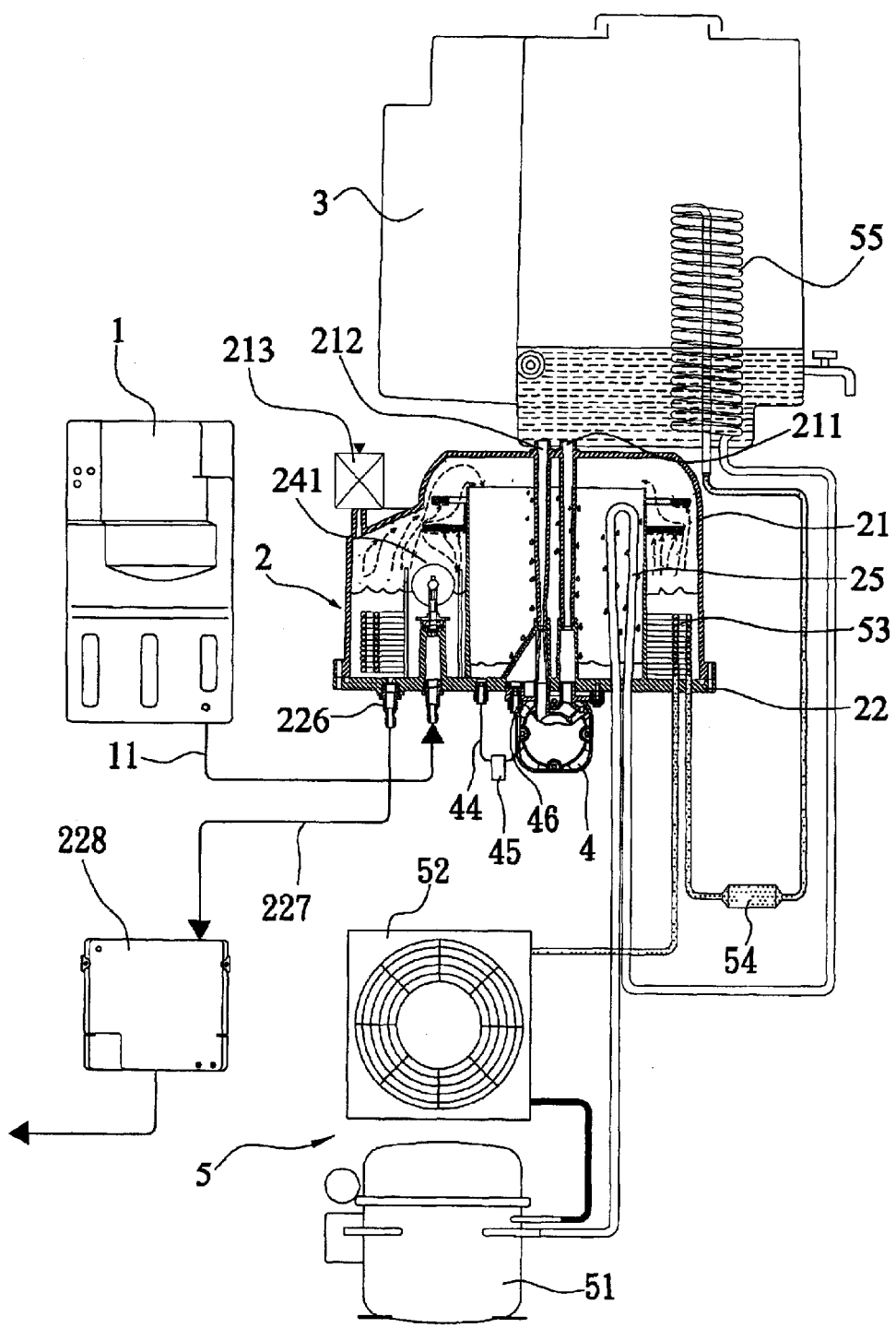
FIG. 1 is a plan view showing arrangements of components included in the pure water dispenser according to the present invention.

Please refer to FIG. 1 that is a plan view of a vacuum low-temperature distilled pure water dispenser according to the present invention. For simplicity, the present invention will be referred to as the pure water dispenser herein. As can be seen in FIG. 1, the pure water dispenser of the present invention mainly includes a water-supply tank 1, a reaction chamber 2, a pure water storage tank 3, an actuating pump 4, and a refrigerating system 5.

The water-supply tank 1 is a container for containing water to be supplied to the reaction chamber 2 for distillation. A water supply line 11 is extended from a bottom of the water-supply tank 1 to the reaction chamber 2.

Figure 2:
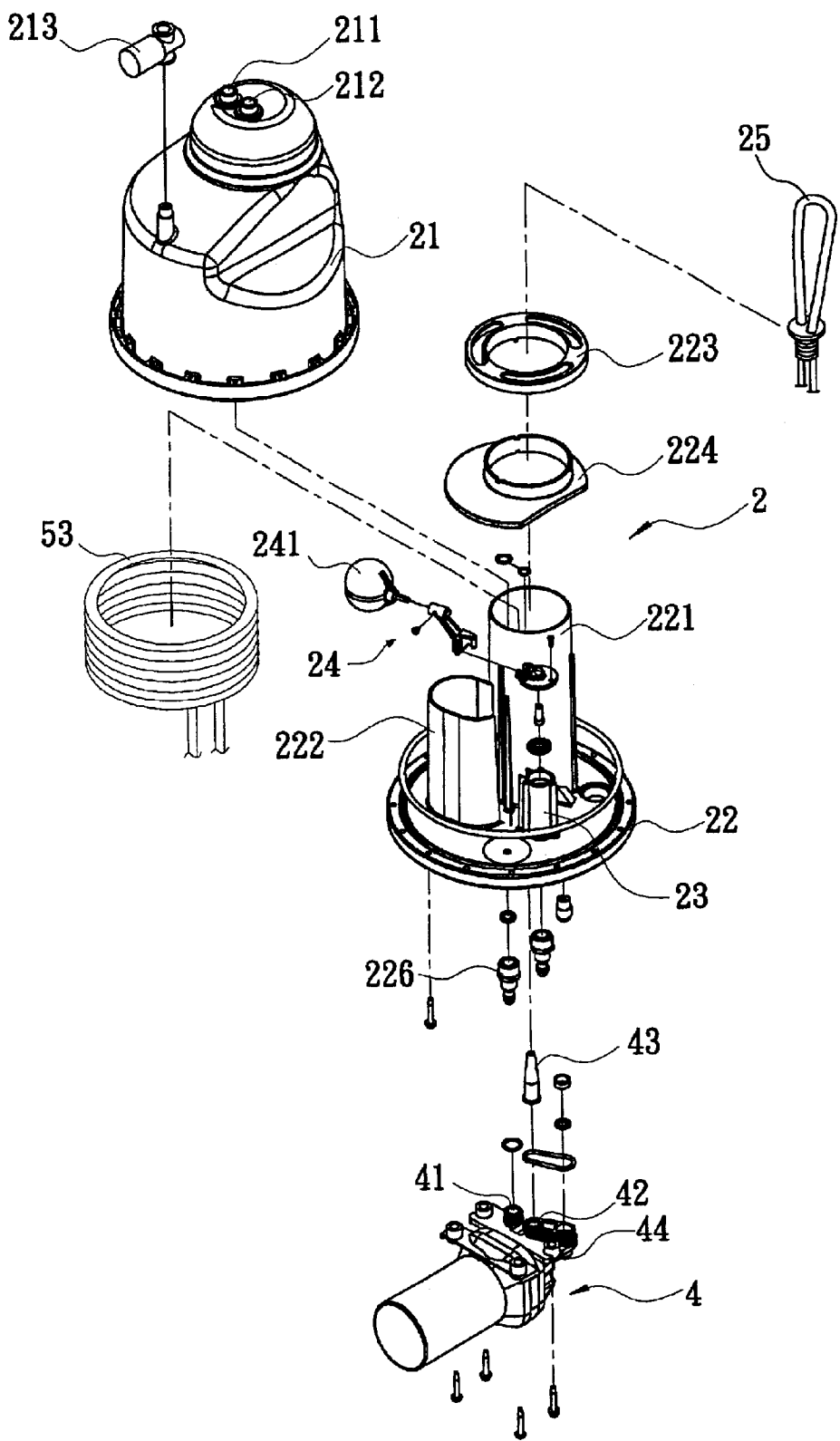
FIG. 2 is an exploded perspective view of a reaction chamber and an actuating pump included in the pure water dispenser of the present invention.
Figure 3:
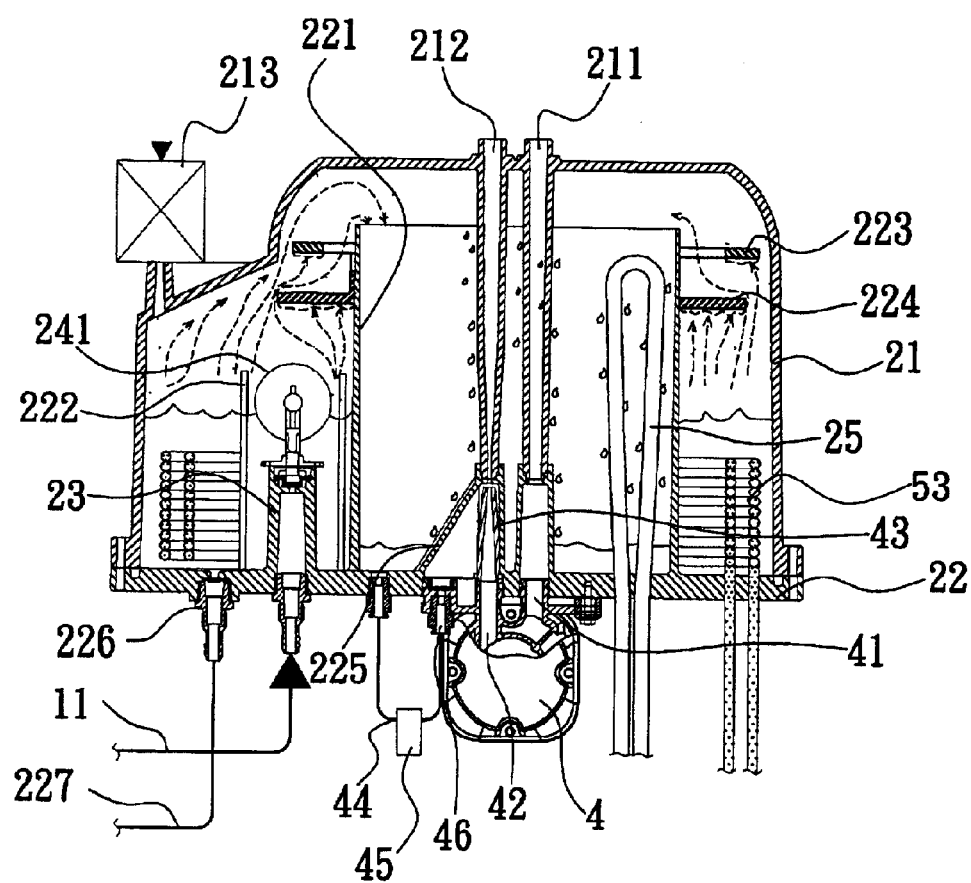
FIG. 3 is an assembled sectional view of the reaction chamber included in the pure water dispenser of the present invention.

The reaction chamber 2, as can be more clearly seen in FIGS. 2 and 3, includes an upper housing 21 and a lower base 22 that together define a sealed hollow space between them. The lower base 22 has an inner barrel 221 and a wave damper 222 formed thereon. A water inlet tube 23 is provided on the lower base 22 at a position corresponding to the water supply line 11, and has a ball float valve assembly 24 provided at an upper end thereof for automatic control of a limit level of water supplied into the reaction chamber 2. An automatic one-way drain valve 226 is also provided on the lower base 22 for draining waste water in the reaction chamber 2 to a waste water tank 228.

The inner barrel 221 is externally provided around an upper outer periphery with spaced upper and lower dams 223, 224, and internally provided with a small-size auxiliary condenser tube 25. A down-stream passage 211 and an up-stream passage 212 are provided to extend from a top of the upper housing 21 down into the inner barrel 221. Uppermost ends of the down-stream and the up-stream passages 211, 212 are communicably connected to a bottom of the pure water storage tank 2, which is located above the reaction chamber 2. A lower end of the down-stream passage 211 is located in the inner barrel 221 to communicate with the actuating pump 4 located below the reaction chamber 2, and a lower end of the up-stream passage 212 is connected to a narrowed upper opening of a guiding cone 225 formed on the lower base 22. A solenoid relief valve 213 is provided to one side of the upper housing 21. And, an evaporator 53 of the refrigerating system 5 is mounted along an inner lower periphery of the reaction chamber 2.

The pure water storage tank 3 is located above the reaction chamber 2 with a bottom communicating with upper ends of the down-stream and the up-stream passages 211, 212. A condenser 55 of the refrigerating system 5 is mounted inside the pure water storage tank 3.

The actuating pump 4 is a water pump using water as a driving source. It is located immediately below the reaction chamber 2 and has a water inlet 41 communicating with the lower end of the down-stream passage 211. The actuating pump 4 also has a water outlet 42, an upper end of which is provided with a compression nozzle 43 that upward extends into the guiding cone 225 formed on the lower base 22 of the reaction chamber 2 to align with and locate below the narrowed upper opening of the guiding cone 225 by a predetermined distance. A water outlet check valve 46 is provided adjacent to the water outlet 42 to locate below the guiding cone 225 and has a flow-guiding tube 44 connected thereto to communicate the water outlet check valve 46 with the inner barrel 221 of the reaction chamber 2. A piece of active carbon 45 is provided at a point on the flow-guiding tube 44.

Please refer to FIG. 1 again, the refrigerating system 5 is in the form of a closed circuit and sequentially includes a compressor 51, an auxiliary radiator 52, an evaporator 53, an expansion valve 54, a condenser 55, and a small-size auxiliary condenser tube 25. The evaporator 53 is mounted in the reaction chamber 2 along a lower inner periphery thereof, the condenser 55 is mounted inside the pure water storage tank 3, and the small-size auxiliary condenser tube 25 is extended through an internal space of the inner barrel 221.

Figure 4:
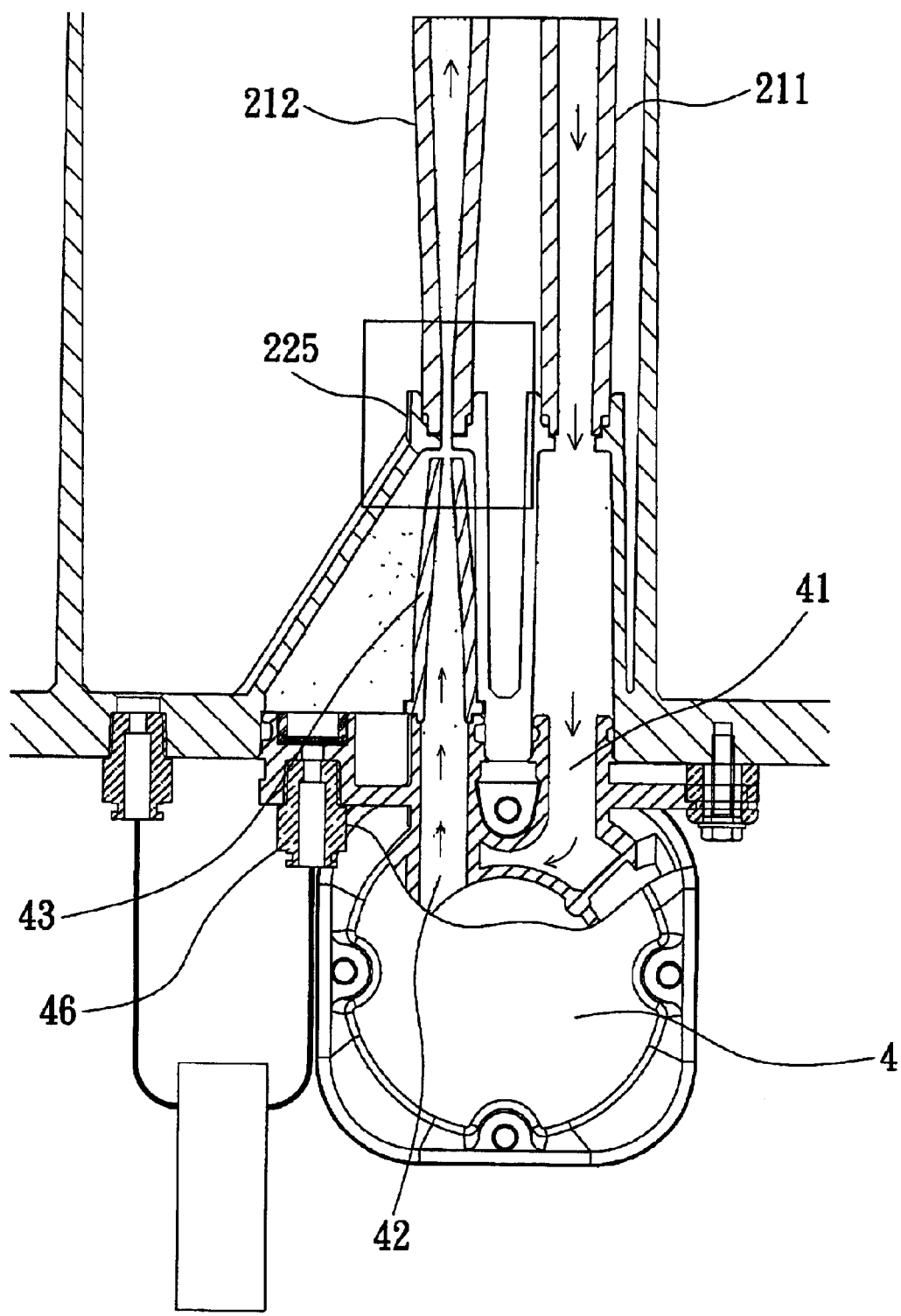
FIG. 4 is a fragmentary and enlarged sectional view showing the structural relation of a compression nozzle with a narrowed upper opening of a guiding cone and a lower end of an up-stream passage in the pure water dispenser of the present invention.
Figure 5:
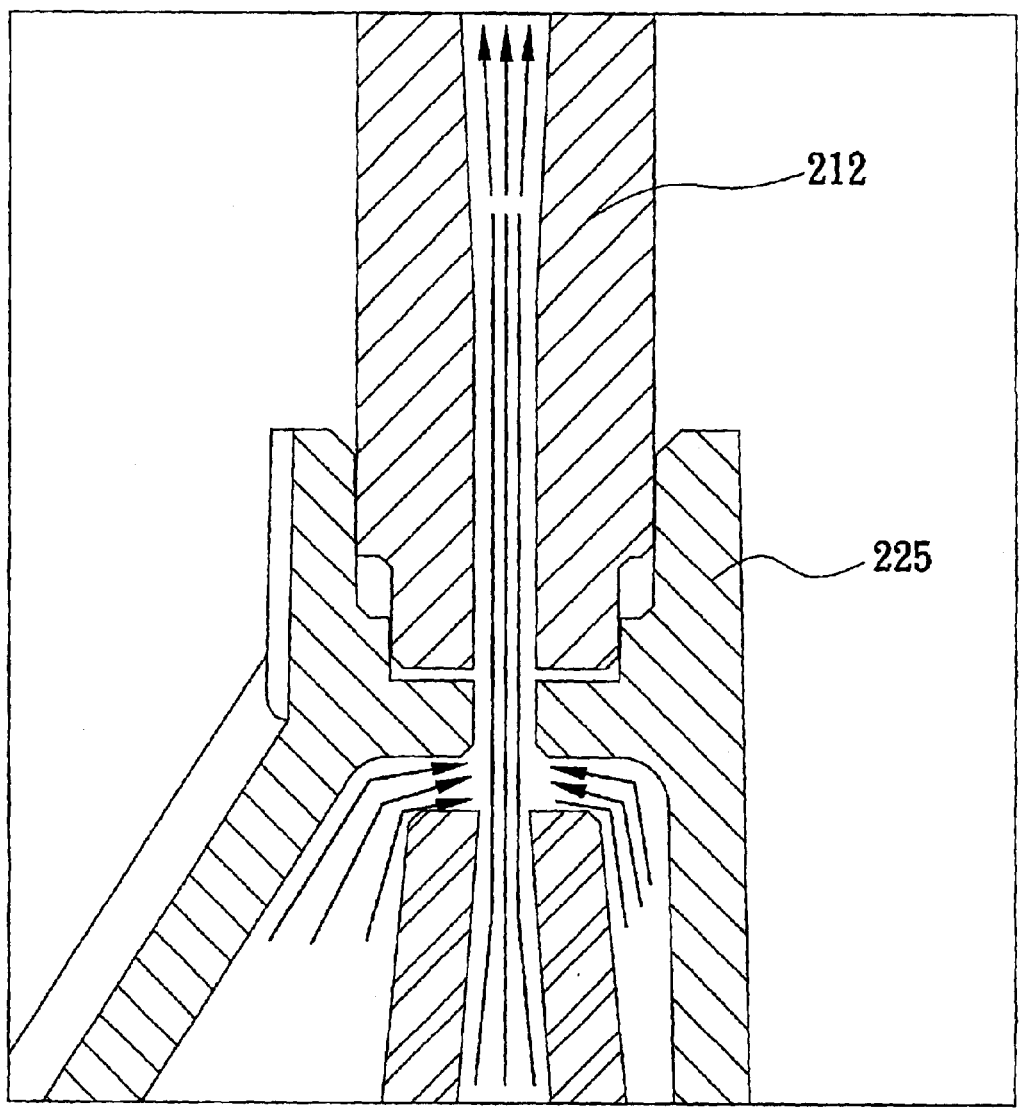
FIG. 5 is a partially enlarged view of FIG. 4.

FIG. 4 is a fragmentary and enlarged sectional view showing the structural relation of the compression nozzle 43 with the narrowed upper opening of the guiding cone 225 and the lower end of the up-stream passage 212 in the pure water dispenser of the present invention, and FIG. 5 is a partially enlarged view of FIG. 4. Please refer to FIGS. 4 and 5. When the pure water dispenser of the present invention is first used, fill the pure water storage tank 3 with about 1000 cc or 1500 cc of distilled water or boiled and cooled water, so that the down-stream and up-stream passages 211, 212, the actuating pump 4, and the water inlet 41 and the water outlet 42 of the pump 4 all are filled up with water. At this point, the water outlet check valve 46 is closed due to weight of water applied thereon, as shown in FIG. 6B. That is, the water filled into the pure water storage tank 3 does not flow into the reaction chamber 2 via the flow-guiding tube 44. When the actuating pump 4 is started, the water in the pure water storage tank 3 is drawn to flow through the down-stream passage 211 and the water inlet 41 of the pump 4 and is pressurized. The pressurized water flows through the water outlet 42 of the pump 4 to pass the compression nozzle 43. Since the compression nozzle 43 is in the form of an upward tapered conic tube having a bore-expanded inlet and a bore-reduced outlet, water flown from the bore-expanded inlet through the bore-reduced outlet of the compression nozzle 43 produces a high-speed water jet. Moreover, since the bore-reduced outlet of the compression nozzle 43 is located below the narrowed upper opening of the guiding cone 225 by a predetermined distance to form a gap between them, the high-speed water jet produced at the bore-reduced outlet of the compression nozzle 43 and passing the gap further produces a low-pressure zone to suck surrounding air and pure water into the high-speed water jet. The water jet with sucked air and pure water then enters the up-stream passage 212. The up-stream passage 212 is in the form of an elongated and downward tapered tube having a bore-reduced lower end and a bore-expanded upper end. This configuration causes the high-speed water jet to slow down when it rushes from the bore-reduced lower end toward the bore-expanded upper end of the up-stream passage 212 and flows back into the pure water storage tank 3 via the upper end of the up-stream passage 212.

When the water flows back into the pure water storage tank 3 to store therein, the air brought by the water into the tank 3 diffuses via a clearance around a cap of the tank 3 into ambient air. The water stored in the pure water storage tank 3 serves as circulating water needed by the actuating pump 4. When the actuating pump 4 keeps operating, water in the storage tank 3 is drawn and pressurized by the actuating pump 4 to circulate in the above-described manner and the compression nozzle 43 keeps producing suction at the gap between it and the up-stream passage 212. In other words, the guiding cone 225 with the compression nozzle 43 extended thereinto defines a closed area therein. When a low pressure is produced in this closed area, a valve lid 261 of the water outlet check valve 46 is upward sucked open, as shown in FIG. 6A. At this point, air and pure water in the reaction chamber 2 are sucked into the closed area in the guiding cone 225 via the flow-guiding tube 44 and the water outlet check valve 46. Therefore, air in the reaction chamber 2 is exhausted via the up-stream passage 212 when the actuating pump 4 operates and the compression nozzle 43 produces the strong water jet and a suction force at the low-pressure zone in the guiding cone 225, producing a negative pressure in the reaction chamber 2.

Figure 8:
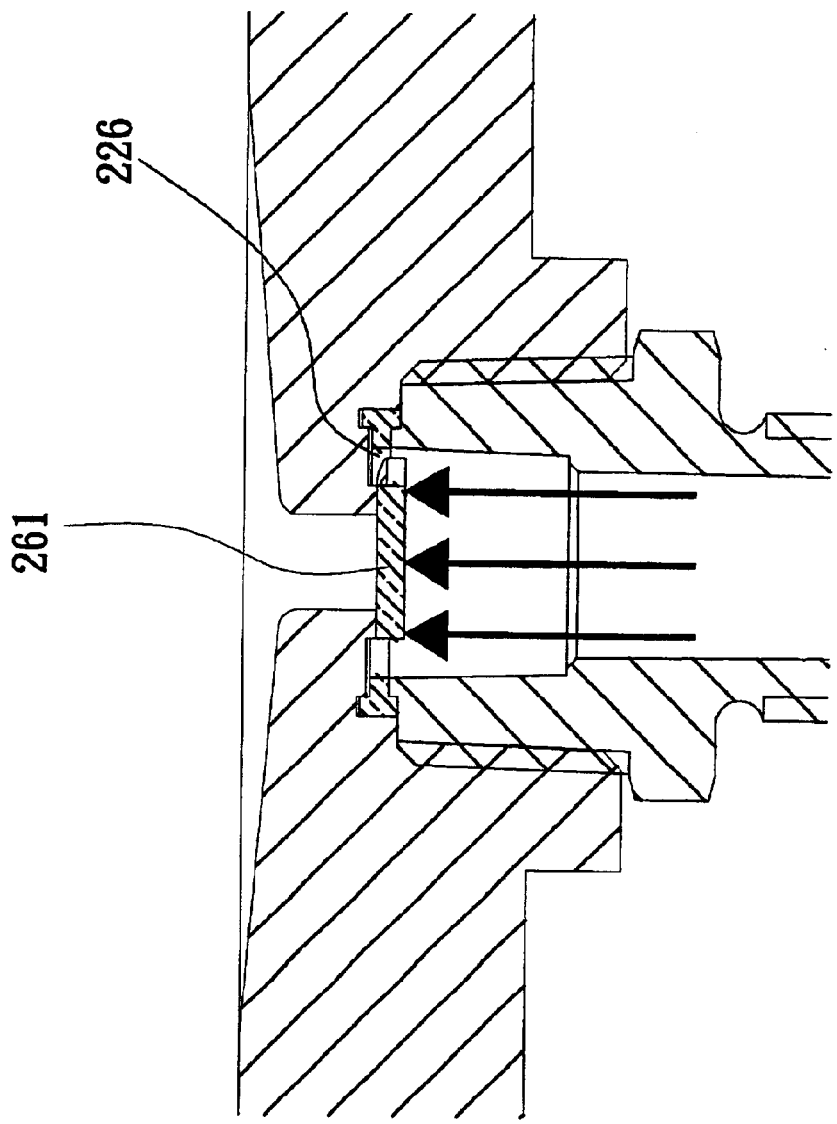
FIG. 8 is a fragmentary and enlarged sectional view of the automatic one-way drain valve included in the present invention being closed by an atmospheric pressure.

When the reaction chamber 2 has a negative pressure therein, a valve lid 261 of the automatic one-way drain valve 226 provided on the lower base 22 of the reaction chamber 2 is subjected to the atmospheric pressure and closes a drain port of the valve 226, as shown in FIG. 8.

Figure 7:
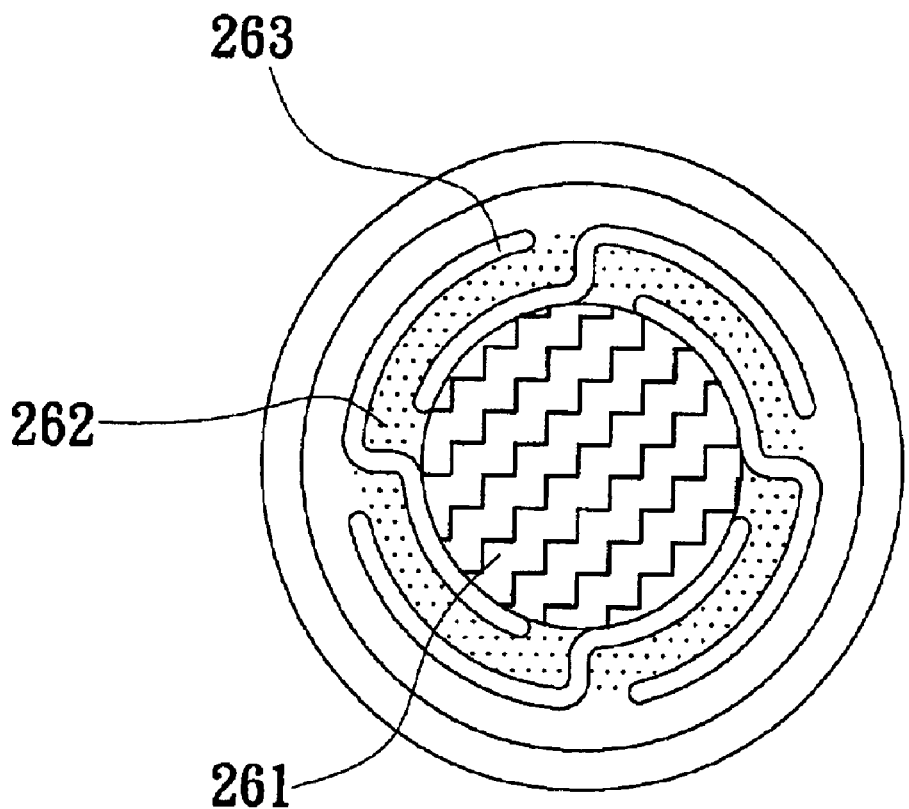
FIG. 7 is a plan view of the water outlet check valve and an automatic one-way drain valve included in the pure water dispenser of the present invention.

Please refer to FIG. 7. Both the automatic one-way drain valve 226 and the water outlet check valve 46 are made of a soft and elastic material and include a valve lid 261 for closing a drain port and a plurality of elastic extension arms 262 wound between the valve lid 261 and a valve body of the check valve. A predetermined clearance 263 is always maintained between the extension arms 262, the valve body, and the valve lid 261, so that the valve lid 261 is able to tightly press against the drain port and seal the same to isolate external air or water from entering into the reaction chamber 2 via the automatic one-way drain valve 226.

Please refer back to FIG. 1. When the reaction chamber 2 has a negative pressure therein, the ball float valve assembly 24 is not subjected to any buoyancy of water and does not close the water inlet tube 23. At this point, a pressure differential between the water-supply tank 1 and the vacuumized reaction chamber 2 causes water in the water-supply tank 1 to be sucked into the reaction chamber 2 via the water supply line 11. When a predetermined level of water in the reaction chamber 2 is reached, the ball float valve assembly 24 automatically closes the water inlet tube 23 due to the buoyancy of water and makes the reaction chamber 2 a closed space. When the actuating pump 4 keeps pumping, a vacuum is produced in the reaction chamber 2. Meanwhile, water in the vacuumized reaction chamber 2 is in contact with the evaporator 53 of the refrigerating system 5 and vaporizes due to heat radiated by the evaporator 53. That is, a vacuum low-temperature distillation process occurs in the reaction chamber 2.

Vapors produced in the reaction chamber 2 during the distillation process move upward to form a layer of mists at a lower surface of each of the upper and the lower dams 223, 224. When the water supplied from the tank 1 into the reaction chamber 2 is kept heating and boiling, a small part of impurities in the water are bounced by the boiling and turbulent water into the upward moving vapors. The upper and the lower dams 223, 224 are provided around the upper outer periphery of the inner barrel 221 to prevent these bounced impurities from directly entering into the inner barrel 221 and to enable vapors to move along an S-shaped path. The impurities, when moving upward, first contact with the lower dam 224 and combine with the layer of mists at the lower surface of the lower dam 224 into water droplets that either attach to the lower dam 224 or drop. Thus, only a very small amount of the impurities could reach the upper dam 223, and most part of this small amount of impurities is further stopped by the upper dam 223 from entering into the inner barrel 221. Meanwhile, the vapors condense on the low-temperature down-stream passage 211 in the inner barrel 221 and are finally collected at the bottom of the inner barrel 221. And, when the actuating pump 4 keeps pumping the circulating water in the storage tank 3, distilled pure water is also sucked into the guiding cone 225 via the flow-guiding tube 44 and further sent into the pure water storage tank 3 via the up-stream passage 212 under the strong suction force produced by the compression nozzle 43 at the upper opening of the guiding cone 225.

In the present invention, heat produced by the compressor 51 of the refrigerating system 5 is utilized as a heat source for reactions in the reaction chamber 2. The heat produced by the compressor 51 is sent via the closed circuit of the refrigerating system 5 to the auxiliary radiator 52 to be cooled to a predetermined temperature. The low-temperature heat is then transmitted via the closed circuit to the evaporator 53 mounted around the inner barrel in the reaction chamber 2, so that the evaporator 53 is heated to a predetermined temperature to heat and vaporize water previously stored in the reaction chamber 2 to produce vapors. The present invention effectively utilizes the heat produced by the compressor 51 without the need of mounting other heating means to distill the water, and is therefore energy saving.

With the condenser 55 of the refrigerating system 5 mounted inside the pure water storage tank 3, low-temperature water guided into the tank 3 via the up-stream passage 212 is further cooled to an even lower temperature. The further cooled pure water in the tank 3, when being drawn by the actuating pump 4, flows through the down-stream passage 211 to lower a temperature thereof, allowing vapors in the reaction chamber 2 to contact with and condense on the cold down-stream passage 211 and finally flow down to the bottom of the inner barrel 221.

The active carbon 45 provided at the flow-guiding tube 44 is used to filter the pure water produced during the low-temperature distillation, so as to remove any odor and organic and inorganic matters, such as methenyl trihalogen, chlorine, etc., to make the finally produced water extremely purified.

To clear up impurities deposited in the reaction chamber 2, the solenoid relief valve 213 provided on the upper housing 21 may be opened to release the reaction chamber 2 from the vacuum state. That is, air pressures inside and outside the reaction chamber 2 reach balance. At this point, the automatic one-way drain valve 226 at the bottom of the lower base 22 is opened due to the weight of water in the reaction chamber 2 applied on the valve lid 261 thereof. Any remained waste water containing impurities in the reaction chamber 2 can therefore be drained via a pipeline 227 to the waste water tank 228. When the waste water is completely drained, the solenoid relief valve 213 is closed and the actuating pump 4 may be actuated again to produce a vacuum in the reaction chamber 2. At this point, the automatic one-way drain valve 226 automatically closes due to the atmospheric pressure and water in the water-supply tank 1 flows via the water-supply line 11 into the reaction chamber 2 via the water inlet tube 23 without the risk of leaking.

In the present invention, the wave damper 222 is provided mainly to shield a ball float 241 of the ball float valve assembly 24 above the water inlet tube 23, so that the ball float 241 is not seriously affected by waves of water occurred during heating of water by the evaporator 53. In this manner, the ball float valve assembly 24 is able to precisely control the volume of water admitted into the reaction chamber 2.

The present invention has been described with a preferred embodiment thereof and it is understood that many changes and modifications in the described embodiment can be carried out without departing from the scope and the spirit of the invention as defined by the appended claims.

What is claimed is:

1. A vacuum low-temperature distilled pure water dispenser, comprising a water-supply tank, a reaction chamber, a pure water storage tank, an actuating pump, and a refrigerating system;

said water-supply tank being a container for containing water to be supplied to said reaction chamber for distillation, and having a water supply line extended from a bottom thereof to said reaction chamber;

said reaction chamber including an upper housing and a lower base that together define a sealed hollow space between them; said lower base having an inner barrel, a wave damper, and a water inlet tube formed thereon, said water inlet tube having a ball float valve assembly provided at an upper end thereof for automatic control of water volume supplied into said reaction chamber, said inner barrel being provided around an upper outer periphery with spaced upper and lower dams and at a bottom with an upward extended guiding cone; a down-stream passage and an up-stream passage being provided to extend from a top of said upper housing down into said inner barrel with uppermost ends of said down-stream and said up-stream passages communicating with a bottom of said pure water storage tank, which is located above said reaction chamber, a lower end of said down-stream passage located in said inner barrel, and a lower end of said up-stream passage connected to a narrowed upper opening of said guiding cone; a solenoid relief valve being provided to one side of said upper housing; an automatic one-way drain valve being provided on said lower base for draining waste water in said reaction chamber to a waste water tank; and an evaporator of said refrigerating system being mounted along a lower inner periphery of said reaction chamber;

said pure water storage tank being located above said reaction chamber and connected at a bottom to said up-stream and said down-stream passages of said reaction chamber, and a condenser of said refrigerating system being mounted in said pure water storage tank;

said actuating pump being a water pump using water as a driving source and located immediately below said reaction chamber; said actuating pump having a water inlet communicating with the lower end of said down-stream passage in said inner barrel of said reaction chamber, a water outlet having an upward tapered compression nozzle connected to an upper end thereof, such that said compression nozzle upward extends into a space defined below said guiding cone provided at the bottom of said inner barrel, and a water outlet check valve provided adjacent to said water outlet to locate below said guiding cone and communicable with an internal space of said inner barrel via a flow-guiding tube; and said refrigerating system being in the form of a closed circuit and sequentially including a compressor, an auxiliary radiator, an evaporator, an expansion valve, a condenser, and a small-size auxiliary condenser tube; said evaporator being mounted in said reaction chamber along a lower inner periphery thereof, said condenser being mounted inside said pure water storage tank, and said small-size auxiliary condenser tube being located in said inner barrel;

whereby when said actuating pump is actuated, a vacuum is produced in said reaction chamber to suck water in said water-supply tank into said reaction chamber, and said water sucked into said vacuumized reaction chamber is heated and vaporized, that is, distilled, by low-temperature heat produced by said compressor of said refrigerating system and transmitted to said evaporator mounted in said reaction chamber, and vapors of said water produced through vacuum low-temperature distillation in said reaction chamber condense to pure water droplets that are collected at the bottom of said inner barrel, and said condensed pure water in said inner barrel is sucked into said guiding cone via said flow-guiding tube and said water outlet valve of said actuating pump that keeps pumping to finally flow upward along said up-steam passage into said pure water storage tank.

* * * * *